US009581450B2

(12) United States Patent
Dhanani et al.

(10) Patent No.: US 9,581,450 B2
(45) Date of Patent: Feb. 28, 2017

(54) NAVIGATION SYSTEM WITH CONTENT RETRIEVING MECHANISM AND METHOD OF OPERATION THEREOF

(71) Applicant: Telenav, Inc., Sunnyvale, CA (US)

(72) Inventors: Salman Dhanani, Redmond, WA (US); Md Ahsan Habib, Santa Clara, CA (US); Harris Warren, Los Gatos, CA (US)

(73) Assignee: Telenav, Inc., Santa Clara, CA (US)

( * ) Notice: Subject to any disclaimer, the term of this patent is extended or adjusted under 35 U.S.C. 154(b) by 76 days.

(21) Appl. No.: 14/049,533

(22) Filed: Oct. 9, 2013

(65) Prior Publication Data

US 2015/0100232 A1  Apr. 9, 2015

(51) Int. Cl.
*G01C 21/12* (2006.01)
*G01C 21/02* (2006.01)
*G01C 21/10* (2006.01)
*G01C 21/26* (2006.01)
*G01C 21/20* (2006.01)
*G01C 21/36* (2006.01)

(52) U.S. Cl.
CPC ............. *G01C 21/26* (2013.01); *G01C 21/20* (2013.01); *G01C 21/3697* (2013.01)

(58) Field of Classification Search
CPC ............ G01C 21/3626; G01C 21/3641; G01C 21/3697; G01C 21/3423; G01C 21/3484; G01C 21/3602; G01C 21/3617; G01C 21/3667; G01C 21/3682
USPC ..... 701/400, 533, 532, 22, 25, 36, 408, 414, 701/423, 455, 465, 538; 726/30
See application file for complete search history.

(56) References Cited

U.S. PATENT DOCUMENTS

| | | | | |
|---|---|---|---|---|
| 8,121,295 B1* | 2/2012 | Everson | ............... | H04L 63/061 380/278 |
| 8,266,714 B2* | 9/2012 | Wang | ...................... | G06F 21/82 709/229 |
| 8,326,486 B2 | 12/2012 | Moinzadeh et al. | | |
| 8,402,484 B2* | 3/2013 | Belz | ........................ | H04N 7/163 348/734 |
| 8,417,944 B2* | 4/2013 | Praden | ............... | H04N 7/17318 713/163 |
| 8,856,331 B2* | 10/2014 | Coyer | ............... | H04L 29/06027 709/226 |
| 9,071,618 B1* | 6/2015 | Pruthi | ................... | H04L 63/105 |
| 2004/0181334 A1* | 9/2004 | Blumbergs | ............. | G01C 21/26 701/538 |
| 2005/0097595 A1* | 5/2005 | Lipsanen | ................ | G06F 21/10 725/25 |
| 2006/0015912 A1* | 1/2006 | Itabashi | ................. | G01C 21/32 725/75 |
| 2006/0123010 A1* | 6/2006 | Landry | ............. | G06F 17/30557 |
| 2006/0293845 A1* | 12/2006 | Watanabe | ............. | G01C 21/32 701/450 |

(Continued)

*Primary Examiner* — Calvin Cheung
*Assistant Examiner* — Luis A Martinez Borrero
(74) *Attorney, Agent, or Firm* — IP Investment Law Group

(57) ABSTRACT

A method of operation of a navigation system includes: determining a travel context with a control unit based on a vehicle information for identifying a vehicle; determining a restriction level based on the travel context for controlling a content retrieval by a head unit from a device; and determining the content retrieval based on the restriction level for displaying a display content on the head unit.

20 Claims, 5 Drawing Sheets

(56) References Cited

U.S. PATENT DOCUMENTS

| | | | | |
|---|---|---|---|---|
| 2007/0083324 A1* | 4/2007 | Suzuki | G01C 21/3629 | 701/420 |
| 2007/0213929 A1* | 9/2007 | Tanizaki | G06F 17/30241 | 701/451 |
| 2009/0082951 A1* | 3/2009 | Graessley | G01C 21/3602 | 701/532 |
| 2009/0164110 A1* | 6/2009 | Basir | G01C 21/362 | 701/117 |
| 2009/0171910 A1* | 7/2009 | Sarkeshik | G06Q 10/00 | |
| 2009/0317066 A1* | 12/2009 | Shibasaki | G06Q 20/12 | 386/241 |
| 2010/0010968 A1* | 1/2010 | Redlich | G06F 17/30672 | 707/E17.014 |
| 2011/0029232 A1* | 2/2011 | Hattori | G01C 21/3682 | 701/533 |
| 2011/0155803 A1* | 6/2011 | Nieuwland | B60R 16/037 | 235/380 |
| 2011/0283336 A1* | 11/2011 | Lange | G06F 17/30867 | 726/1 |
| 2012/0259947 A1 | 10/2012 | Park | | |
| 2012/0310534 A1* | 12/2012 | Mizuno | G01C 21/3617 | 701/540 |
| 2013/0054674 A1* | 2/2013 | Myers | H04L 67/34 | 709/203 |
| 2013/0086518 A1 | 4/2013 | Partk et al. | | |
| 2013/0111610 A1* | 5/2013 | Bestmann | G06F 21/6245 | 726/30 |
| 2013/0217365 A1* | 8/2013 | Ramnani | H04L 67/306 | 455/414.1 |
| 2013/0302756 A1* | 11/2013 | Takeuchi | F02D 41/1401 | 434/64 |
| 2014/0115725 A1* | 4/2014 | Seo | G06F 3/0488 | 726/30 |
| 2014/0136607 A1* | 5/2014 | Ou | H04L 67/18 | 709/203 |
| 2014/0310403 A1* | 10/2014 | Weiss | H04L 41/0813 | 709/224 |
| 2014/0365120 A1* | 12/2014 | Vulcano | G01C 21/36 | 701/532 |

* cited by examiner

NAVIGATION SYSTEM WITH CONTENT RETRIEVING MECHANISM AND METHOD OF OPERATION THEREOF

TECHNICAL FIELD

The present invention relates generally to a navigation system, and more particularly to a system with content retrieving mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without content retrieving mechanism to effectively control the content sharing has become a paramount concern for the consumer. The inability decreases the benefit of using the tool.

Thus, a need still remains for a navigation system with content retrieving mechanism to optimally sharing content between devices. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a travel context with a control unit based on a vehicle information for identifying a vehicle; determining a restriction level based on the travel context for controlling a content retrieval by a head unit from a device; and determining the content retrieval based on the restriction level for displaying a display content on the head unit.

The present invention provides a navigation system, including: a control unit for: determining a travel context based on a vehicle information for identifying a vehicle, determining a restriction level based on the travel context for controlling a content retrieval by a head unit from a device, determining the content retrieval based on the restriction level, and an user interface, coupled to the control unit, for displaying a display content on the head unit.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
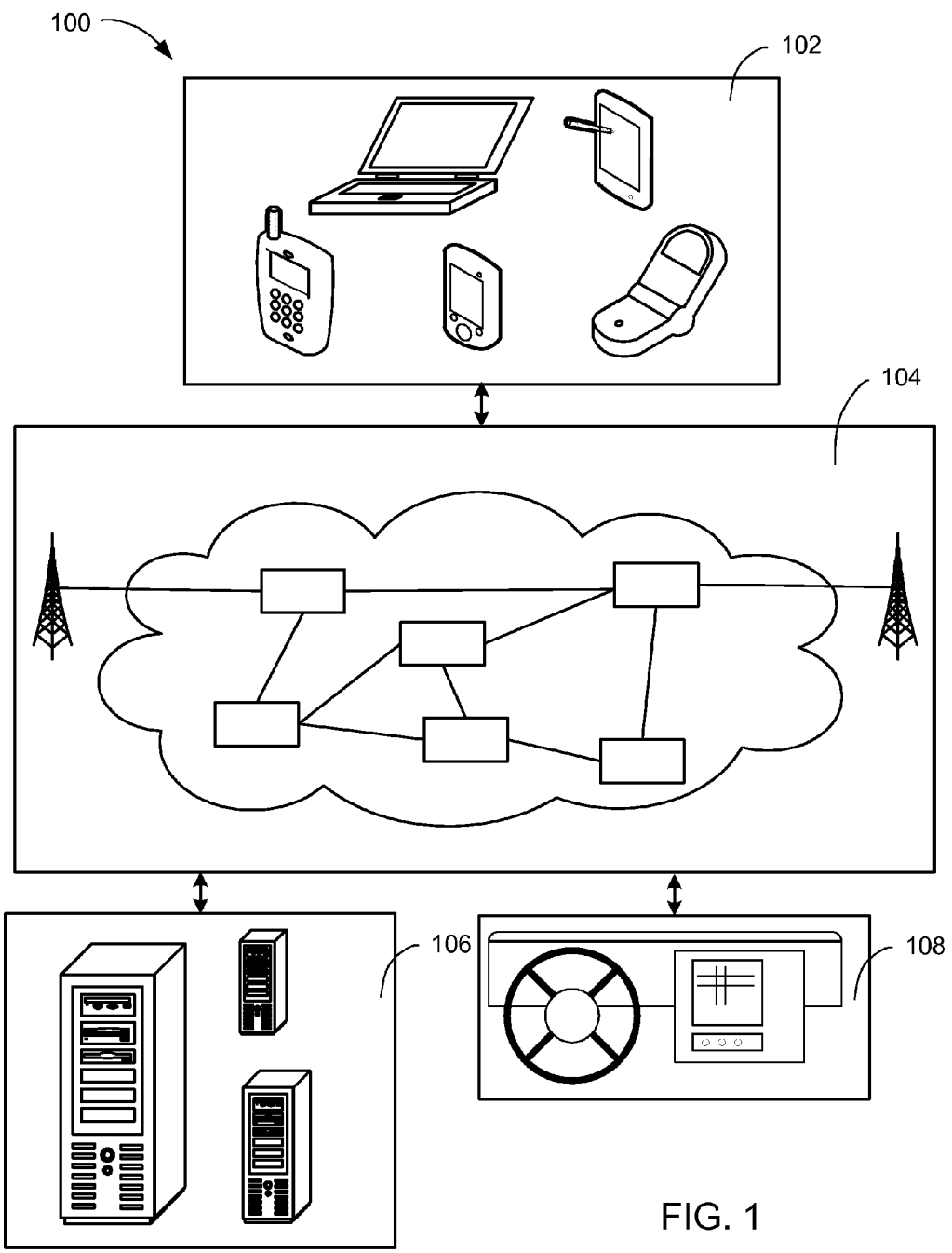
FIG. 1 is a navigation system with content retrieving mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with content retrieving mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

The navigation system 100 can also include a third device 108 connected to the first device 102, the second device 106, or a combination thereof with the communication path 104. The third device 108 can be a client or server. The third device 108 can be a standalone device, or can be incorporated with a vehicle, for example a car, truck, bus, or train.

For illustrative purposes, the navigation system 100 is described with the first device 102 or the third device 108 as a mobile device, although it is understood that the first device 102 or the third device 108 can be different types of devices. For example, the first device 102 or the third device 108 can also be a non-mobile computing device, such as a server, a server farm, a head unit, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102 or the third device 108. The second device 106 can also be a client type device as described for the first device 102 or the third device 108.

In another example, the first device 102 the first device 102, the second device 106, or the third device 108 can be a particularized machine, such as a mainframe, a server, a cluster server, a rack mounted server, or a blade server, or as more specific examples, an IBM System z10™ Business Class mainframe or a HP ProLiant ML™ server. Yet another example, the first device 102, the second device 106, or the third device 108 can be a particularized machine, such as a portable computing device, a thin client, a notebook, a netbook, a smartphone, personal digital assistant, a tablet, a smart watch, a smart glasses, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the navigation system 100 is shown with the second device 106 and the first device 102 or the third device 108 as end points of the communication path 104, although it is understood that the navigation system 100 can have a different partition between the first device 102, the second device 106, the third device 108, and the communication path 104. For example, the first device 102, the second device 106, the third device 108 or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
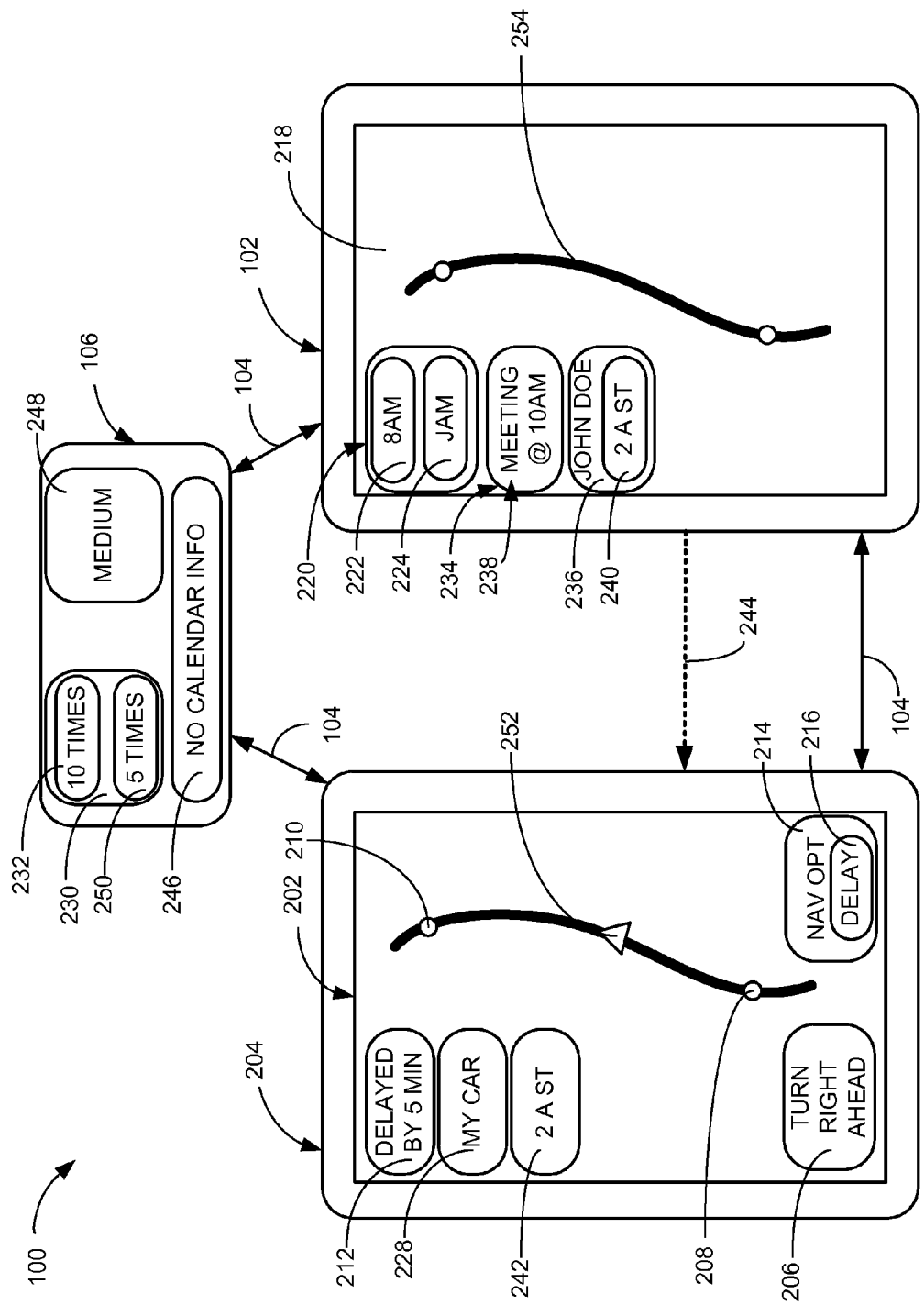
FIG. 2 is an example of the third device of FIG. 1 retrieving a display content from the first device.

Referring now to FIG. 2, there is shown an example of the third device 108 of FIG. 1 retrieving a display content 202 from the first device 102. For clarity and brevity, the discussion of the embodiment of the present invention will focus on the third device 108 retrieving the result generated by the navigation system 100 from the first device 102. However, the second device 106, the third device 108, and the first device 102 can be discussed interchangeably. For example, the first device 102 can retrieve the display content 202 from the third device 108.

For clarity and brevity, the third device 108 can represent a head unit 204, which is defined as a non-mobile device installed in a vehicle 252. The third device 108 and the head unit 204 can be discussed interchangeably. And also for clarity and brevity, the first device 102 can represent the user's mobile device as discussed above in FIG. 1.

The display content 202 is defined as content retrieved from a device to be displayed on another device. As discussed, the display content 202 can be retrieved by the head unit 204 from the first device 102. The display content 202 can include a navigation guidance 206. The navigation guidance 206 is defined as information to aid the user's travel. For example, the navigation guidance 206 can represent a turn-by-turn direction, a route from a current location 208 to a target destination 210, or a combination thereof. The current location 208 can represent the physical location of the first device 102, the head unit 204, or a combination thereof. The target destination 210 can represent a physical location where the travel ends. The navigation guidance 206 can also include a travel reminder 212, which is defined as a notification to provide updated status regarding the user's travel. The navigation guidance 206 can include a travel route 254, which is defined as a path to aid the user's travel to reach the target destination 210.

The display content 202 can include a navigation option 214, which is defined as a selection option for operating the navigation system 100. For example, the navigation option 214 can include a delay notification 216. The delay notification 216 is defined as the selection option to notify the tardiness of the travel. For example, the user of the navigation system 100 can select the delay notification 216 to notify other users that the user will arrive at the target destination 210 later than the expected arrival time. The delay notification 216 can include the information, such as how late the user will arrive.

A travel context 218 is defined as a situation, circumstance, or a combination thereof surrounding the first device 102, the head unit 204, or a combination thereof. For example, the travel context 218 can be determined based on a travel condition 220. The travel condition 220 can include a travel time 222, a traffic information 224, a travel history 226, a vehicle information 228, or a combination thereof. The travel time 222 is defined as time of day when the user's travel is occurring. The traffic information 224 is defined a route condition surrounding the user's travel. The travel history 226 is defined as a record of the user's travel.

The vehicle information 228 is defined as information related to the vehicle 252 where both the first device 102 and the head unit 204 are located. For example, the vehicle information 228 can represent the vehicle 252 where a connectivity record 230 exists between the first device 102 and the head unit 204.

The connectivity record 230 is defined as evidence that the third device 108 had retrieved the display content 202 from the first device 102 via the communication path 104. For example, the connectivity record 230 can represent that the head unit 204 had retrieved the display content 202 from the first device 102 via the communication path 104 representing Bluetooth. For another example, the connectivity record 230 can represent that the head unit 204 had retrieved the display content 202 from the first device 102 via the communication path 104 representing HDMI.

For further example, the connectivity record 230 can include a connectivity frequency 232, which is defined as a count for number of times that the head unit 204 had established connection with the first device 102 via the communication path 104. A frequency threshold 250 is defined as a minimum number of the connectivity frequency 232 required.

The head unit 204 can retrieve a calendar information 234, a contact information 236, or a combination thereof from the first device 102. The calendar information 234 is defined as schedule information. For example, the calendar information 234 can include a travel purpose 238, which is defined a reason, a theme, or a combination thereof for the user's travel. The contact information 236 is defined as information related to people, entity, or a combination thereof. The entity can include a business organization, a government organization, or a combination thereof. For example, the contact information 236 can represent phone number, email address, website address, or a combination thereof. The contact information 236 can also include an address information 240, which is defined as a physical address. For example, the address information 240 can represent the full address of the target destination 210.

The display content 202 can also include the calendar information 234, the contact information 236, or a combination thereof. More specifically, a content type 242 is defined as a category of the display content 202. For example, the content type 242 can include the navigation guidance 206, the calendar information 234, the contact information 236, or a combination thereof.

A content retrieval 244 is defined as a result of whether the head unit 204 can retrieve the display content 202 from the first device 102. For example, the content retrieval 244 can dictate the navigation system 100 for how the head unit 204 can retrieve the display content 202 from the first device 102. For a specific example, the determination of the content retrieval 244 can allow the head unit 204 to retrieve the address information 240 but not the calendar information 234.

A content restriction 246 is defined as a limitation placed on the head unit 204 for retrieving the display content 202 from the first device 102. For example, the content restriction 246 can be controlled by a restriction level 248, which is defined as an amount restriction for the content restriction 246. The restriction level 248 can represent minimum, medium, maximum, or a combination thereof. The restriction level 248 representing minimum can place no restriction on the head unit 204. The restriction level 248 representing maximum can place no retrieval by the head unit 204. The restriction level 248 can be adjusted granularly and provide a range of restriction to provide the content restriction 246 suited for the travel context 218. Details will be discussed below.

Figure 3:
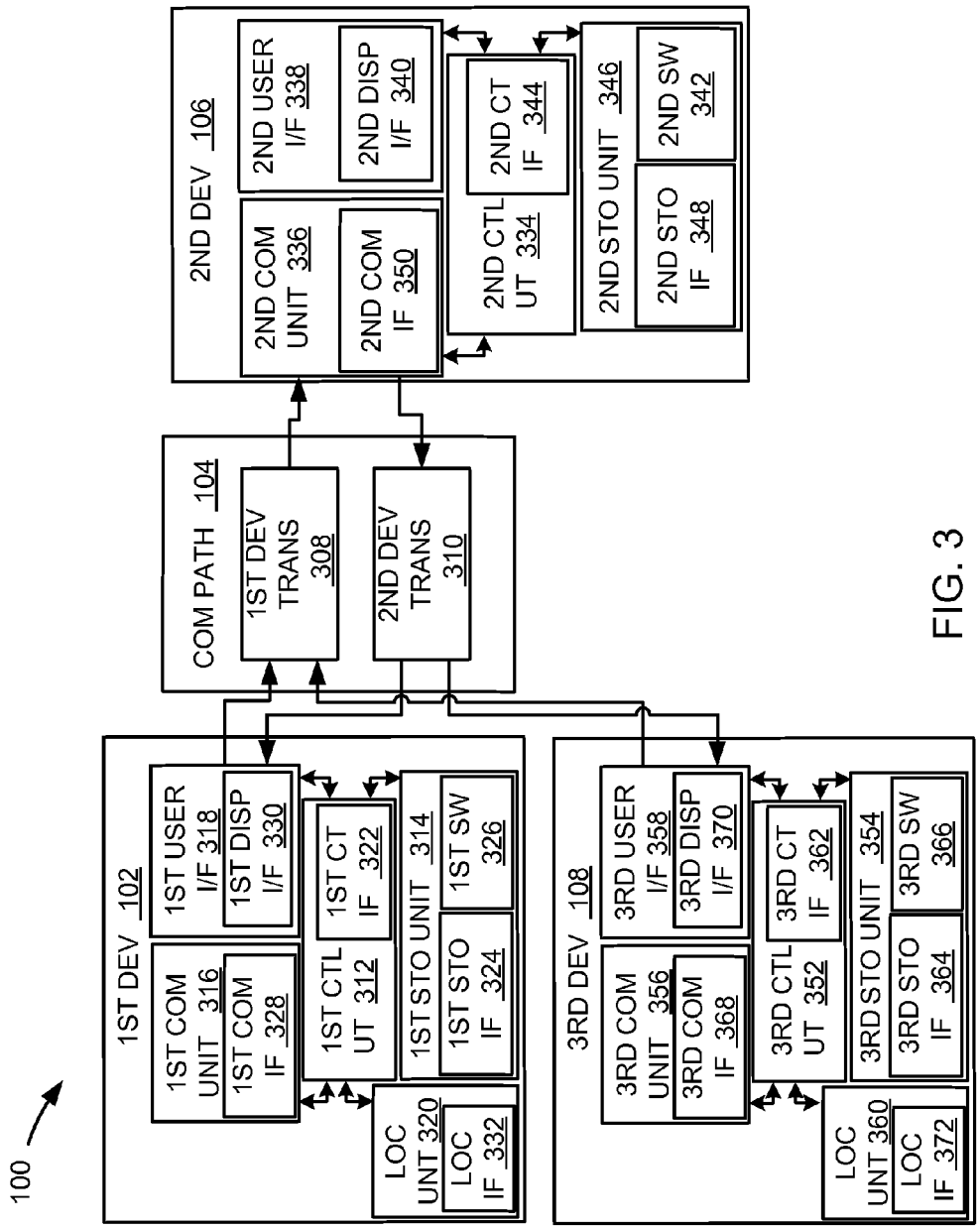
FIG. 3 is an exemplary block diagram of the navigation system.

Referring now to FIG. 3, therein is shown an exemplary block diagram of the navigation system 100. The navigation system 100 can include the first device 102, the third device 108, the communication path 104, and the second device 106. The first device 102 or the third device 108 can send information in a first device transmission 308 over the communication path 104 to the second device 106. The second device 106 can send information in a second device transmission 310 over the communication path 104 to the first device 102 or the third device 108.

For illustrative purposes, the navigation system 100 is shown with the first device 102 or the third device 108 as a client device, although it is understood that the navigation system 100 can have the first device 102 or the third device 108 as a different type of device. For example, the first device 102 or the third device 108 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 or the third device 108 will be described as a client device and the second device 106 will be described as a server device. The embodiment of the present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, a camera, or any combination thereof to provide data and communication inputs.

The first user interface 318 can include a first display interface 330. The first display interface 330 can include a display, a projector, a video screen, a speaker, a headset, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, a camera, or any combination thereof to provide data and communication inputs. Examples of the output device of the second user interface 338 can include a second display interface 340. The second display interface 340 can include a display, a projector, a video screen, a speaker, a headset, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The third device 108 can include a third control unit 352, a third storage unit 354, a third communication unit 356, a third user interface 358, and a location unit 360. The third control unit 352 can include a third control interface 362. The third control unit 352 can execute a third software 366 to provide the intelligence of the navigation system 100. The third control unit 352 can be implemented in a number of different manners. For example, the third control unit 352 can be a processor, an embedded processor, a microprocessor, a hardware control logic, a hardware finite state machine (FSM), a digital signal processor (DSP), or a combination thereof. The third control interface 362 can be used for communication between the third control unit 352 and other functional units in the third device 108. The third control interface 362 can also be used for communication that is external to the third device 108.

The third control interface 362 can receive information from the other functional units or from external sources, or can transmit information to the other functional units or to external destinations. The external sources and the external destinations refer to sources and destinations physically separate to the third device 108.

The third control interface 362 can be implemented in different ways and can include different implementations depending on which functional units or external units are being interfaced with the third control interface 362. For example, the third control interface 362 can be implemented with a pressure sensor, an inertial sensor, a microelectromechanical system (MEMS), optical circuitry, waveguides, wireless circuitry, wireline circuitry, or a combination thereof.

The location unit 360 can generate location information, current heading, and current speed of the third device 108, as examples. The location unit 360 can be implemented in many ways. For example, the location unit 360 can function as at least a part of a global positioning system (GPS), an inertial navigation system, a cellular-tower location system, a pressure location system, or any combination thereof.

The location unit 360 can include a location interface 372. The location interface 372 can be used for communication between the location unit 360 and other functional units in the third device 108. The location interface 372 can also be used for communication that is external to the third device 108.

The location interface 372 can receive information from the other functional units or from external sources, or can transmit information to the other functional units or to external destinations. The external sources and the external destinations refer to sources and destinations physically separate to the third device 108.

The location interface 372 can include different implementations depending on which functional units or external units are being interfaced with the location unit 360. The location interface 372 can be implemented with technologies and techniques similar to the implementation of the third control interface 362.

The third storage unit 354 can store the third software 366. The third storage unit 354 can also store the relevant information, such as advertisements, points of interest (POI), navigation routing entries, or any combination thereof.

The third storage unit 354 can be a volatile memory, a nonvolatile memory, an internal memory, an external memory, or a combination thereof. For example, the third storage unit 354 can be a nonvolatile storage such as non-volatile random access memory (NVRAM), Flash memory, disk storage, or a volatile storage such as static random access memory (SRAM).

The third storage unit 354 can include a third storage interface 364. The third storage interface 364 can be used for communication between the location unit 360 and other functional units in the third device 108. The third storage interface 364 can also be used for communication that is external to the third device 108.

The third storage interface 364 can receive information from the other functional units or from external sources, or can transmit information to the other functional units or to external destinations. The external sources and the external destinations refer to sources and destinations physically separate to the third device 108.

The third storage interface 364 can include different implementations depending on which functional units or external units are being interfaced with the third storage unit 354. The third storage interface 364 can be implemented with technologies and techniques similar to the implementation of the third control interface 362.

The third communication unit 356 can enable external communication to and from the third device 108. For example, the third communication unit 356 can permit the third device 108 to communicate with the second device 106 of FIG. 1, an attachment, such as a peripheral device or a computer desktop, and the communication path 104.

The third communication unit 356 can also function as a communication hub allowing the third device 108 to function as part of the communication path 104 and not limited to be an end point or terminal unit to the communication path 104. The third communication unit 356 can include active and passive components, such as microelectronics or an antenna, for interaction with the communication path 104.

The third communication unit 356 can include a third communication interface 368. The third communication interface 368 can be used for communication between the third communication unit 356 and other functional units in the third device 108. The third communication interface 368 can receive information from the other functional units or can transmit information to the other functional units.

The third communication interface 368 can include different implementations depending on which functional units are being interfaced with the third communication unit 356. The third communication interface 368 can be implemented with technologies and techniques similar to the implementation of the third control interface 362.

The third user interface 358 allows a user (not shown) to interface and interact with the third device 108. The third user interface 358 can include an input device and an output device. Examples of the input device of the third user interface 358 can include a keypad, a touchpad, soft-keys, a keyboard, a microphone, or any combination thereof to provide data and communication inputs.

The third user interface 358 can include a third display interface 370. The third display interface 370 can include a display, a projector, a video screen, a speaker, or any combination thereof.

The third control unit 352 can operate the third user interface 358 to display information generated by the navigation system 100. The third control unit 352 can also execute the third software 366 for the other functions of the navigation system 100, including receiving location information from the location unit 360. The third control unit 352 can further execute the third software 366 for interaction with the communication path 104 via the third communication unit 356.

The functional units in the first device 102 can work individually and independently of the other functional units. The first device 102 can work individually and independently from the second device 106, the third device 108, and the communication path 104.

The functional units in the second device 106 can work individually and independently of the other functional units. The second device 106 can work individually and independently from the first device 102, the third device 108, and the communication path 104.

The functional units in the third device 108 can work individually and independently of the other functional units. The third device 108 can work individually and independently from the first device 102, the second device 106, and the communication path 104.

For illustrative purposes, the navigation system 100 is described by operation of the first device 102, the second device 106, and the third device 108. It is understood that the first device 102, the second device 106, the third device 108 can operate any of the modules and functions of the navigation system 100. For example, the first device 102 is described to operate the location unit 320, although it is understood that the second device 106 or the third device 108 can also operate the location unit 320.

Figure 4:
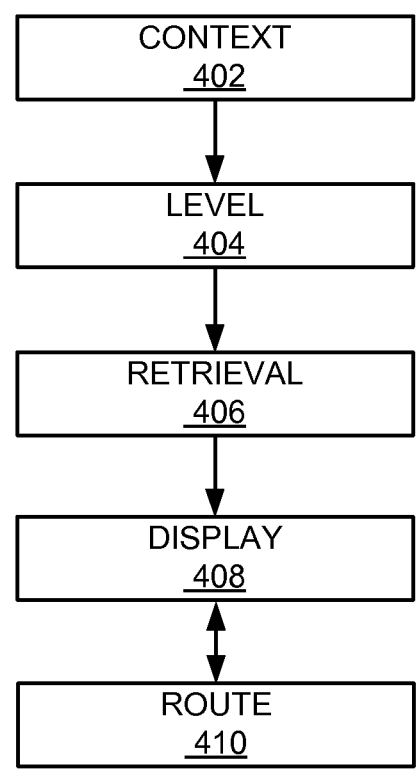
FIG. 4 is a control flow of the navigation system.

Referring now to FIG. 4, therein is shown a control flow of the navigation system 100. The navigation system 100 can include a context module 402. The context module 402 determines the travel context 218 of FIG. 2. For example, the context module 402 can determine the travel context 218 based on the travel condition 220 of FIG. 2.

The context module 402 can determine the travel context 218 in a number of ways. For example, the context module 402 can determine the travel context 218 based on the travel purpose 238 of FIG. 2, the target destination 210 of FIG. 2, or a combination thereof. The travel purpose 238 can represent "meeting with client" based from the calendar information 234 of FIG. 2. Further, the target destination 210 can represent "555 Main Street" based from the address information 240 of FIG. 2 from the calendar information 234. Based on the travel purpose 238 and the target destination 210 associated with the travel purpose 238, the context module 402 can determine the travel context 218 to represent traveling to a client meeting at the target destination 210.

For another example, the context module 402 can determine the travel context 218 based on the vehicle information 228 of FIG. 2. More specifically, the vehicle information 228 can represent the vehicle 252 known to the user or the vehicle 252 unknown to the user. For a specific example, the vehicle 252 known to the user can represent the vehicle 252 with the head unit 204 that the first device 102 had established the communication path 104 of FIG. 1 previously, such as user's vehicle or friend's vehicle. Thus, the connectivity record 230 of FIG. 2 between the first device 102 and the head unit 204 can exist. The vehicle 252 unknown to the user can represent the vehicle 252 with the head unit 204 that the first device 102 had not established the communication path 104 previously, such as a taxi, thus, no record of the connectivity record 230. Based on the vehicle information 228, the context module 402 can determine whether the user with the first device 102 is traveling in a known or an unknown vehicle.

For another example, the context module 402 can determine the travel context 218 based on the travel condition 220, the current location 208 of FIG. 2, or a combination thereof. More specifically, the travel condition 220 can represent the travel time 222 of FIG. 2, the traffic information 224 of FIG. 2, the travel history 226 of FIG. 2, or a combination thereof. The current location 208 can represent that the user of the navigation system 100 is on a freeway. The traffic information 224 for the freeway can be traffic jam. Based on the traffic information 224 and the current location 208, the context module 402 can determine the travel context 218 to represent that the user is stuck in traffic. The context module 402 can send the travel context 218 to a level module 404.

The navigation system 100 can include a level module 404, which can couple to the context module 402. The level module 404 determines the restriction level 248 of FIG. 2. For example, the level module 404 can determine the restriction level 248 of the content restriction 246 of FIG. 2.

The level module 404 can determine the restriction level 248 in a number of ways. For example, the level module 404 can determine the restriction level 248 based on the travel context 218 according to the vehicle information 228. More specifically, if the vehicle information 228 represents that the user is operating the user's own car, the level module 404 can determine the restriction level 248 of none. In contrast, if the vehicle information 228 represents that the user is in a stranger's vehicle, the level module 404 can determine the restriction level 248 to be maximum.

For further example, the level module 404 can determine the restriction level 248 based on the connectivity record 230. More specifically, the level module 404 can determine the restriction level 248 based on the connectivity frequency 232 of FIG. 2 of the connectivity record 230. For example, the connectivity frequency 232 can represent zero. The level module 404 can determine that the restriction level 248 should be set to maximum to protect the privacy of the user. In contrast, the connectivity frequency 232 can meet or be greater than the frequency threshold 250 of FIG. 2. Based on the connectivity frequency 232 meeting or exceeding the frequency threshold 250, the level module 404 can determine the restriction level 248 to no restriction or not.

Moreover, the level module 404 can adjust the frequency threshold 250 for updating the restriction level 248. For a specific example, the level module 404 can decrease the frequency threshold 250 based on an increase of the connectivity frequency 232. In contrast, the level module 404 can increase the frequency threshold 250 based on a decrease of the connectivity frequency.

For another example, the level module 404 can determine the restriction level 248 based on the content type 242 of FIG. 2 of the display content 202 of FIG. 2. More specifically, the restriction level 248 can place different level of the content restriction 246 for the content type 242. For example, if the restriction level 248 is no restriction, all instances of the content type 242 can be retrievable to be displayed on the head unit 204. In contrast, as an example, if the restriction level 248 is set to maximum, the content type 242 with privacy concern can be irretrievable. For a specific example, the content type 242 representing the contact information 236 of FIG. 2, such as the address information 240, the calendar information 234, such as the travel purpose 238, or a combination thereof can be irretrievable.

For a different example, the level module 404 can determine the restriction level 248 based on the travel condition 220. More specifically, the travel condition can represent the travel time 222 of night time. The current location 208 and the travel history 226 can indicate that the user of the navigation system 100 has not been in the geographic area. Based on the travel condition 220, the level module 404 can increase or decrease the restriction level 248 to adjust the amount of the display content 202 displayed on the head unit 204. The level module 404 can send the restriction level 248 to a retrieval module 406.

The navigation system 100 can include the retrieval module 406, which can couple to the level module 404. The retrieval module 406 determines the content retrieval 244 of FIG. 2. For example, the retrieval module 406 can determine the content retrieval 244 based on the travel context 218, the restriction level 248, or a combination thereof.

The retrieval module 406 can determine the content retrieval 244 in a number of ways. For example, the retrieval module 406 can determine the content retrieval 244 based on the travel context 218, the contact information 236, the calendar information 234, or a combination thereof. More specifically, the travel context 218 can represent that the vehicle information 228 is user's own car. The calendar information 234 can represent that that the user has the travel purpose 238 of a business meeting at the target destination 210. Based on the vehicle information 228, the calendar information 234, or a combination thereof, the retrieval module 406 can determine the content retrieval 244 for retrieving the contact information 236, the calendar information 234, or a combination thereof for displaying on the head unit 204.

More specifically, the retrieval module 406 can determine the content retrieval 244 based on the restriction level 248 of the content restriction 246. If the user is currently operating the user's own car, the retrieval module 406 can determine that the content restriction 246 is not required for the content retrieval 244. The restriction level 248 can be without any restriction. As a result, the retrieval module 406 can determine the content retrieval 244 of retrieving the calendar information 234 including the travel purpose 238 of business meeting, the names of the attendees of the business meeting, or a combination thereof. The retrieval module 406 can also determine the content retrieval 244 of retrieving the contact information 236 including the full address, the contact information 236, such as phone number and email address, or a combination thereof.

In contrast, if the vehicle information 228 indicates that the user is in a stranger's car, the retrieval module 406 can determine the content retrieval 244 with the content restriction 246. For a specific example, the retrieval module 406 can restrict the content retrieval 244 based on the restriction level 248 of maximum restriction. As a result, the retrieval module 406 can determine the content retrieval 244 only for the navigation guidance 206 of FIG. 2 including the target destination 210 and the address information 240 representing the full address to be displayed on the head unit 204 from after retrieving from the first device 102 of the user. The retrieval module 406 can send the content retrieval 244 to a display module 408.

It has been discovered that the navigation system 100 determining the content retrieval 244 based on the restriction level 248 can improve the privacy of the user of the navigation system 100. By allowing the content retrieval 244 based on the restriction level 248, the navigation system 100 can control the content retrieval 244 of the display content 202 based on the travel context 218, the content type 242, or a combination thereof. As a result, the display content 202 can be retrieved efficiently for the improved privacy for operating the navigation system 100, the vehicle 252, or a combination thereof.

The navigation system 100 can include the display module 408, which can couple to the retrieval module 406. The display module 408 displays the display content 202. For example, the display module 408 can display the display content 202 based on the content retrieval 244.

The display module 408 can display the display content 202 in a number of ways. For example, the display module 408 can display the display content 202 based on the content restriction 246 placed on the content retrieval 244. More specifically, if the restriction level 248 of the content restriction 246 is set as no restriction, the display module 408 can display the display content 202 retrieved from the first device 102 to be displayed on the head unit 204 without the content restriction 246.

In contrast, the display module 408 can display the display content 202 based on the restriction level 248 of the content restriction 246. As discussed above, as an example, the restriction level 248 determines the content type 242 retrievable, thus, displayable on the head unit 204. For example, if the restriction level 248 is set to maximum, the display module 408 can display the content type 242 representing the navigation guidance 206 without the calendar information 234, the contact information 236, or a combination thereof. For a different example, if the restriction level 248 is set to medium, the display module 408 can display the content type 242 representing the navigation guidance 206 with the contact information 236 but without the calendar information 234.

More specifically, the user of the navigation system 100 can make an entry on the head unit 204. If the restriction level 248 is set to maximum, the display module 408 can display the navigation guidance 206 on the head unit 204 without the calendar information 234, the contact information 236, or a combination thereof. In contrast, if the restriction level 248 is set to medium, the display module 408 can display the content type 242 representing the navigation guidance 206 with the contact information 236 on the head unit 204 but without the calendar information 234. The user of the navigation system 100 can perform a search on the contact information 236 displayed on the head unit 204 to select the address information 240. The display module 408 can send the address information 240 to a route module 410.

For another example, the display module 408 can display the display content 202 representing the navigation guidance 206. More specifically, the address information 240 can be retrieved from the first device 102 to the head unit 204 based on the content retrieval 244. As a result, the user of the navigation system 100 can access the address information 240 retrieved on the head unit 204 to search for the contact information 236 within the head unit 204 instead of the first device 102 before sending a request to the first device 102.

For a different example, the display module 408 can display the display content 202 representing the travel reminder 212 of FIG. 2 based on the travel context 218, the calendar information 234 retrieved, or a combination thereof. For a specific example, the travel context 218 can represent the traffic information 224 of traffic jam. The calendar information 234 can represent the travel purpose 238 of business dinner. Based on the traffic information 224 and the calendar information 234, the display module 408 can display the travel reminder 212 of an updated estimated time of arrival.

For another example, the display module 408 can display the display content 202 represent the navigation option 214 of FIG. 2. More specifically, the navigation option 214 can represent the delay notification 216 of FIG. 2. Continuing with the previous example, the user of the navigation system 100 can be late due to the traffic jam. The display module 408 can display the delay notification 216 to allow the user to contact the meeting attendees with one push of a button regarding the updated estimated time of arrival.

The navigation system 100 can include the route module 410, which can couple to the display module 408. The route module 410 generates the travel route 254 of FIG. 2. For example, the route module 410 can generate the travel route 254 based on the address information 240 selected by the user of the navigation system 100. The route module 410 can send the travel route 254 to the display module 408 for displaying the travel route 254 on the head unit 204 for the user to see after selecting the address information 240.

The physical transformation from traveling from one instance of the travel context 218 to another instance of the travel context 218 results in the movement in the physical world, such as people using the first device 102, the vehicle 252, or a combination thereof, based on the operation of the navigation system 100. As the movement in the physical world occurs, the movement itself creates additional information that is converted back into the restriction level 248, the content retrieval 244, or a combination thereof to display the display content 202 for the continued operation of the navigation system 100 and to continue the movement in the physical world.

The first software 326 of FIG. 3 of the first device 102 of FIG. 3 can include the modules for the navigation system 100. For example, the first software 326 can include the context module 402, the level module 404, the retrieval module 406, the display module 408, and the route module 410.

The first control unit 312 of FIG. 3 can execute the first software 326 for the context module 402 to determine the travel context 218. The first control unit 312 can execute the first software 326 for the retrieval module 406 to determine the restriction level 248. The first control unit 312 can execute the first software 326 for the retrieval module 406 to determine the content retrieval 244. The first control unit 312 can execute the first software 326 for the display module 408 to display the display content 202. Moreover, the first user interface 318 can display the display content 202. The first control unit 312 can execute the first software 326 for the route module 410 to generate the travel route 254.

The second software 342 of FIG. 3 of the second device 106 of FIG. 3 can include the modules for the navigation system 100. For example, the second software 342 can include the context module 402, the level module 404, the retrieval module 406, the display module 408, and the route module 410.

The second control unit 334 of FIG. 3 can execute the second software 342 for the context module 402 to determine the travel context 218. The second control unit 334 can execute the second software 342 for the retrieval module 406 to determine the restriction level 248. The second control unit 334 can execute the second software 342 for the retrieval module 406 to determine the content retrieval 244. The second control unit 334 can execute the second software 342 for the display module 408 to display the display content 202. Moreover, the second user interface 338 can display the display content 202. The second control unit 334 can execute the second software 342 for the route module 410 to generate the travel route 254.

The third software 366 of FIG. 3 of the third device 108 of FIG. 3 can include the modules for the navigation system 100. For example, the third software 366 can include the context module 402, the level module 404, the retrieval module 406, the display module 408, and the route module 410.

The third control unit 352 of FIG. 3 can execute the third software 366 for the context module 402 to determine the travel context 218. The third control unit 352 can execute the third software 366 for the retrieval module 406 to determine the restriction level 248. The third control unit 352 can execute the third software 366 for the retrieval module 406 to determine the content retrieval 244. The third control unit 352 can execute the third software 366 for the display module 408 to display the display content 202. Moreover, the third user interface 358 can display the display content 202. The third control unit 352 can execute the third software 366 for the route module 410 to generate the travel route 254.

The modules of the navigation system 100 can be partitioned between the first software 326, the second software 342, and the third software 366. The second software 342 can include the level module 404, and the retrieval module 406. The first software 326 can include the context module 402 and the route module 410. The third software 366 can include the display module 408.

The navigation system 100 describes the module functions or order as an example. The modules can be partitioned differently. For example, the level module 404 and the retrieval module 406 can be combined. Each of the modules can operate individually and independently of the other modules. Furthermore, data generated in one module can be used by another module without being directly coupled to each other. For example, the retrieval module 406 can receive the travel context 218 from the context module 402.

It has been discovered that the navigation system 100 can determine the travel context 218 based on the vehicle information 228 for identifying the vehicle 252 to improve the privacy of the display content 202 retrieved. By determining the travel context 218, the navigation system 100 can determine the restriction level 248 to control the content retrieval 244 by the head unit 204 from the first device 102. As a result, the navigation system 100 can display the display content 202 most optimal for the travel context 218 to secure the privacy of the user of the navigation system 100.

The modules described in this application can be hardware implementation or hardware accelerators in the first control unit 312, the second control unit 334, or in the third control unit 352. The modules can also be hardware implementation or hardware accelerators within the first device 102, the second device 106, or the third device 108 but outside of the first control unit 312, the second control unit 334, or the third control unit 352 respectively, as depicted in FIG. 3. However, it is understood that the first control unit 312, the second control unit 334, or the third control unit 352, or a combination thereof can collectively refer to all hardware accelerators for the modules.

The modules described in this application can be implemented as instructions stored on a non-transitory computer readable medium to be executed by the first control unit 312, the second control unit 334, or the third control unit 352, or a combination thereof. The non-transitory computer medium can include the first storage unit 314 of FIG. 3, the second storage unit 346 of FIG. 3, a third storage unit 354 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 5:
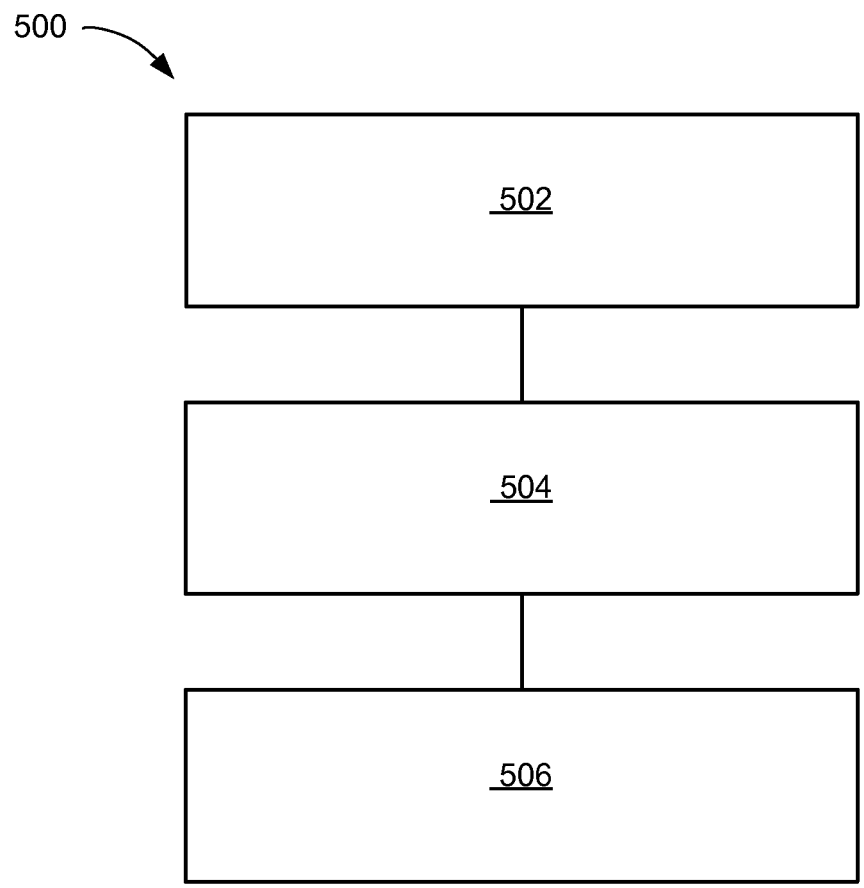
FIG. 5 is a flow chart of a method of operation of the navigation system in a further embodiment of the present invention.

Referring now to FIG. 5, therein is shown a flow chart of a method 500 of operation of the navigation system 100 in a further embodiment of the present invention. The method 500 includes: determining a travel context with a control unit based on a vehicle information for identifying a vehicle in a block 502; determining a restriction level based on the travel context for controlling a content retrieval by a head unit from a device in a block 504; and determining the content retrieval based on the restriction level for displaying a display content on the head unit in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining a travel context with a control unit based on a travel condition including a vehicle information for identifying a vehicle;
    determining a restriction level based on the travel context for adjusting the restriction level to control a content retrieval by a head unit representing a non-mobile device installed in the vehicle from a device representing a mobile device; and
    determining the content retrieval based on the restriction level for displaying a display content on the head unit; and
    updating the restriction level based on a change in the travel condition from traveling from one instance of the travel context to another instance of the travel context for adjusting the content retrievable by the head unit.

2. The method as claimed in claim 1 wherein determining the restriction level includes determining the restriction level based on the vehicle information for controlling the content retrieval.

3. The method as claimed in claim 1 wherein determining the restriction level includes determining the restriction level based on a content type for controlling the display content displayed on the head unit.

4. The method as claimed in claim 1 wherein determining the restriction level includes determining the restriction level based on a connectivity record meeting or exceeding a frequency threshold for controlling the content retrieval.

5. The method as claimed in claim 1 wherein determining the restriction level includes determining the restriction level based on a travel condition for adjusting a frequency level to update the restriction level.

6. The method as claimed in claim 1 wherein determining the content retrieval includes determining the content retrieval based on the travel context for retrieving a contact information.

7. The method as claimed in claim 1 wherein determining the content retrieval includes determining the content retrieval based on the vehicle information for controlling the content retrieval of a calendar information, a contact information, or a combination thereof.

8. The method as claimed in claim 1 wherein determining the content retrieval includes determining the content retrieval based on the travel context for retrieving a calendar information.

9. The method as claimed in claim 1 further comprising displaying the display content based on the content retrieval for displaying a contact information.

10. The method as claimed in claim 1 further comprising displaying the display content based on the content retrieval for displaying a calendar information.

11. A navigation system comprising:
    a control unit for:
        determining a travel context based on a vehicle information for identifying a vehicle,
        determining a restriction level based on the travel context for adjusting the restriction level to control a content retrieval by a head unit representing a non-mobile device installed in the vehicle from a device representing a mobile device,
        determining the content retrieval based on the restriction level,
        adjusting the restriction level based on a change in the travel context for adjusting the content retrievable by the head unit, and
    an user interface, coupled to the control unit, for displaying a display content on the head unit.

12. The system as claimed in claim 11 wherein the control unit is for determining the restriction level based on the vehicle information for controlling the content retrieval.

13. The system as claimed in claim 11 wherein the control unit is for determining the restriction level based on a content type for controlling the display content displayed on the head unit.

14. The system as claimed in claim 11 wherein the control unit is for determining the restriction level based on a connectivity record meeting or exceeding a frequency threshold for controlling the content retrieval.

15. The system as claimed in claim 11 wherein the control unit is for determining the restriction level based on a travel condition for adjusting a frequency level to update the restriction level.

16. The system as claimed in claim 11 wherein the control unit is for determining the content retrieval based on the travel context for retrieving a contact information.

17. The system as claimed in claim 11 wherein the control unit is for determining the content retrieval based on the vehicle information for controlling the content retrieval of a calendar information, a contact information, or a combination thereof.

18. The system as claimed in claim 11 wherein the control unit is for determining the content retrieval based on the travel context for retrieving a calendar information.

19. The system as claimed in claim 11 wherein the control unit is for displaying the display content based on the content retrieval for displaying a contact information.

20. The system as claimed in claim 11 wherein the control unit is for displaying the display content based on the content retrieval for displaying a calendar information.

* * * * *